United States Patent
Gatto et al.

(10) Patent No.: US 10,504,228 B2
(45) Date of Patent: Dec. 10, 2019

(54) IMAGE PROCESSING SYSTEM AND METHOD

(71) Applicant: Sony Corporation, Tokyo (JP)

(72) Inventors: Alexander Gatto, Stuttgart (DE); Piergiorgio Sartor, Fellbach (DE); Matthias Wilde, Stuttgart (DE); Ralf Mueller, Wernau (DE)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/572,587

(22) PCT Filed: Apr. 29, 2016

(86) PCT No.: PCT/EP2016/059685
§ 371 (c)(1),
(2) Date: Nov. 8, 2017

(87) PCT Pub. No.: WO2016/184666
PCT Pub. Date: Nov. 24, 2016

(65) Prior Publication Data
US 2018/0137620 A1    May 17, 2018

(30) Foreign Application Priority Data

May 15, 2015 (EP) .................................... 15167901

(51) Int. Cl.
*G06T 7/00* (2017.01)
*G06K 9/00* (2006.01)
(Continued)

(52) U.S. Cl.
CPC ........ *G06T 7/0014* (2013.01); *G06K 9/00899* (2013.01); *G06K 9/2036* (2013.01);
(Continued)

(58) Field of Classification Search
CPC ........... G06K 9/00885; G06K 9/00899; G06K 2009/4657; G06K 9/46; G06K 9/2036;
(Continued)

(56) References Cited

U.S. PATENT DOCUMENTS 7,203,345 B2   4/2007   Rowe et al.
7,831,072 B2   11/2010  Rowe
(Continued)

FOREIGN PATENT DOCUMENTS

| CN | 101398898 A | 4/2009 |
|---|---|---|
| CN | 103268499 A | 8/2013 |
| WO | 2006/093508 A2 | 9/2006 |

OTHER PUBLICATIONS

Slide presentation, "Types of Biometrics," Chang Jia, Sep. 12, 2005, 39 pages, based on "Guide to Biometrics," Ch. 3 & 4, by Ruud M. Bolle, et al., Springer Science & Business Media, Inc., 2004.
(Continued)

*Primary Examiner* — Yon J Couso
(74) *Attorney, Agent, or Firm* — Xsensus LLP

(57) ABSTRACT

In an image processing system a processor is configured to perform an image processing method. The method performs receiving a spectral image of a person's skin and identifying the person based on the received spectral image of the person's skin and skin reflectance information.

17 Claims, 8 Drawing Sheets

(51) Int. Cl.
  *G06T 7/90* (2017.01)
  *G06K 9/20* (2006.01)
  *G06K 9/46* (2006.01)
  *G06T 7/11* (2017.01)
(52) U.S. Cl.
  CPC ............... *G06K 9/46* (2013.01); *G06T 7/90* (2017.01); *G06K 2009/4657* (2013.01); *G06T 7/11* (2017.01); *G06T 2207/10024* (2013.01); *G06T 2207/30088* (2013.01)
(58) Field of Classification Search
  CPC . G06T 7/0014; G06T 7/90; G06T 7/11; G06T 2207/10024; G06T 2207/30088
  See application file for complete search history.

(56) References Cited

U.S. PATENT DOCUMENTS

| | | | |
|---|---|---|---|
| 2007/0122005 A1* | 5/2007 | Kage | G06K 9/00275 382/115 |
| 2008/0298649 A1 | 12/2008 | Ennis et al. | |
| 2013/0342702 A1 | 12/2013 | Zhang et al. | |
| 2014/0016832 A1* | 1/2014 | Kong | A61B 5/1171 382/115 |
| 2014/0304629 A1* | 10/2014 | Cummins | A61B 5/742 715/764 |
| 2015/0205992 A1* | 7/2015 | Rowe | G06K 9/2018 382/124 |
| 2018/0150726 A1* | 5/2018 | Gorban | G06K 9/6257 |

OTHER PUBLICATIONS

Jelte Peter Vink, et al., "Robust skin detection using multi-spectral illumination," Mar. 2011, Ninth IEEE International Conference on Automatic Face and Gesture Recognition (FG 2011), 8 pages.

Moritz Storring, et al., "A multispectral approach to robust human skin detection," Conference on Colour in Graphics, Imaging, and Vision, CGIV 2004 Final Program and Proceedings pp. 110-115(6), Jan. 1, 2004, 2 pages (Abstract only).

International Search Report dated Jun. 21, 2016 in PCT/EP2016/059685 filed Apr. 29, 2016.

* cited by examiner

IMAGE PROCESSING SYSTEM AND METHOD

CROSS-REFERENCE TO RELATED APPLICATIONS

The present application is based on PCT filing PCT/EP2016/059685 filed Apr. 29, 2016, and claims priority to European Patent Application 15167901.6 filed by the European Patent Office on 15 May 2015, the entire contents of each of which being incorporated herein by reference.

TECHNICAL FIELD

The present disclosure generally pertains to an image processing system and an image processing method for skin-based user-identification. Furthermore, the present disclosure pertains to an image processing system and an image processing method for object detection.

TECHNICAL BACKGROUND

Biometric identification systems play an important role in the field of user identification. For example, finger print scanners, iris scanners and face recognition systems are typically used for user identification. Such biometric identification systems require a direct interaction with persons to be identified. E.g. the persons have to come into direct contact with a scanner, e.g. finger print scanners, or have to look at least towards the direction of a camera system, e.g. for face recognition or iris scanning. These requirements are uncomfortable and, if a large group of persons shall be identified at the same time, further time-consuming.

Furthermore, the mentioned biometric identification systems are often based on skin detection. Usually, skin detection systems acquire RGB images, analyse the colour space and deliver a map identifying skin-coloured regions and other regions. These skin detection systems work fine until an image with skin-coloured regions is presented to them. In this case the skin-coloured regions of the image which represent "fake" skin are detected as "real" human skin. Therefore, the mentioned biometric identification systems are cheatable. For example, a finger print system can be cheated by a simple paper copy of a finger print. In the same way also iris scan systems or face recognition systems can be bypassed by using images of irises or a face.

Although there exist techniques for biometric user identification and for human skin detection, it is generally desirable to provide an image processing method and an image processing system for reliable user identification and/or for reliable skin detection.

SUMMARY

According to a first aspect the disclosure provides an image processing system including a processor configured to receive a spectral image of a person's skin and to identify the person based on the received spectral image of the person's skin and skin reflectance information.

According to a second aspect the disclosure provides an image processing method including receiving a spectral image of a person's skin and identifying the person based on the received spectral image of the person's skin and skin reflectance information.

According to a third aspect the disclosure provides an image processing system including a processor configure to receive a spectral image, generating a first object map based on the spectral image, the first object map identifying for each preset area of the spectral image split into preset areas whether the preset area is related to an object or not, receiving an RGB image, generating a second object map based on the RGB image, the second object map identifying for each preset area of the RGB image split into preset areas whether the preset area is related to the objector not and generating the real object map by combining the first object map generated based on the spectral image and the second object map generated based on the RGB image.

According to a fourth aspect the disclosure provides an image processing method including receiving a spectral image, generating a first object map based on the spectral image, the first object map identifying for each preset area of the spectral image split into preset areas whether the preset area is related to an object or not, receiving an RGB image, generating a second object map based on the RGB image, the second object map identifying for each preset area of the RGB image split into preset areas whether the preset area is related to the object or not and generating the real objet map by combining the first object map generated based on the spectral image and the second object map generated based on the RGB image.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
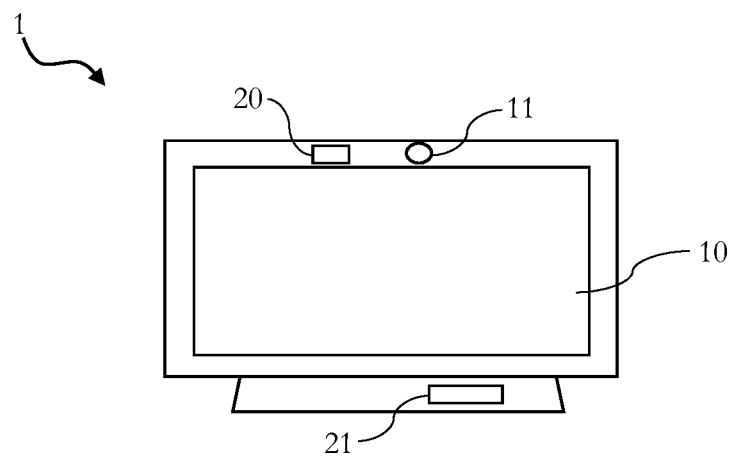
FIG. 1 schematically illustrates an image processing system in form of a smart television which is configured to identify a person based on a multispectral image of the person's skin.

Before a detailed description of the embodiments under reference of FIG. 1 to FIG. 11, general explanations are made.

The image processing systems and methods for skin-based user-identification described below are based on human spectral skin characteristics, e.g. a reflectance of human skin, which vary from person to person.

In the following optional process features of the image processing systems and methods for identifying a person are explained with respect to an image processing system. However, each of these process features, separate or in combination with one or more other features, is to be understood as feature of an image processing method as well.

An image processing system for identifying a person includes a processor configured to perform a method including receiving a spectral image of a person's skin, e.g. obtained by a spectral camera, and identifying the person based on the received spectral image of the person's skin and skin reflection information. The spectral image may be a multispectral image from a multispectral camera, a hyperspectral image from a hyperspectral camera or the like. The spectral image may include spectral data of the person's skin, e.g. reflectance data of the person's skin, which varies from person to person and can therefore be used for identifying the person. The spectral image is denoted in some passages below as "first spectral image". The skin reflection information may comprise skin reflection information of registered users stored in a database and will be described in more detail below.

In some embodiments the processor of the image processing system may be configured to perform the image processing method which may include generating a skin map defining for each preset area of an image split into preset areas whether the preset area is related to skin or not, wherein identifying the person is based on the skin map. Generating the skin map may include for each preset area of the image analysing the preset area with respect to a skin characteristics dependent on the type of image, e.g. a colour of the preset area or a spectral data, e.g. reflectance data on the person's skin, of the preset area, determining whether the preset area represents skin or not and registering the determined results in a preset area map to form the skin map. Each preset area may be a pixel of the image or a group of several pixels.

For example, the image underlying the skin map is a RGB image, e.g. obtained by a RGB camera. Where throughout the disclosure a RGB image or a RGB camera is mentioned, a colour image or a colour camera such as a CMYK image or a CMYK camera or the like may be used.

In some embodiments the processor may be configured to perform the image processing method which may include receiving an RGB image, e.g. obtained by a RGB camera, and generating a skin map based on the RGB image (RGB-based skin map), the skin map identifying for each preset area of the RGB image split into preset areas whether the preset area is related to skin or not, wherein identifying the person is further based on the skin map. Generating the skin map based on the RGB image may include for each preset area determining whether the colour of the preset area is skin-coloured or not. The RGB image may be associated with the spectral image. For example, the image represents a scenery, e.g. the person in an environment like a room, at least partially identical to that represented by the spectral image and/or a pixel distribution of the RGB image may at least partially correspond to a pixel distribution of the spectral image. Thus, identifying the person on the basis of the RGB-image-based skin map may increase reliability of the image processing system for identifying a person, since the identification process can be mainly based on preset areas, e.g. pixels, related to skin, in particular only based on preset areas related to skin. The RGB-based skin map is denoted below also as "second skin map".

Alternatively, the image underlying the skin map may be the spectral image of the person's skin, e.g. obtained by the spectral camera. In some embodiments the processor of the image processing system for identifying a person therefore may be configured to perform the image processing method which may include generating a first skin map based on the spectral image (spectral-based skin map), the first skin map identifying for each preset area of the spectral image split into preset areas whether the preset area is related to skin or not, wherein identifying the person is based on the first (spectral-based) skin map.

The image underlying the skin map may be another spectral image of the person's skin, e.g. obtained by another spectral camera. In some embodiments the processor of the image processing system for identifying a person therefore may be configured to perform the image processing method which may include receiving another spectral image obtained by the other spectral camera and generating a skin map based on the other spectral image obtained from the other spectral camera, the skin map identifying for each preset area of the other spectral image split into preset areas whether the preset area is related to skin or not, wherein identifying the person is further based on the spectral-based skin map. The other spectral image received from the other spectral camera may be associated with the spectral image, e.g. with respect to a scenery and/or a pixel distribution.

Details for generating the spectral-based skin map e.g. based on the spectral image or the other spectral image will be described in more detail below with respect to the skin map denoted as "first skin map". In some embodiments the processor of the image processing system for identifying a person may be configured to perform the image processing method which may include generating a real skin map indicating for each preset area of the spectral image split into preset areas, e.g. obtained by the spectral camera, whether the preset area is related to real skin or not, wherein identifying the person is based on the real skin map. The real skin map allows differentiating whether a preset area of the spectral image, e.g. a pixel or a group of pixels is related to a skin-coloured object such as a picture of skin or to real human skin of a person's body. Thus, it is not possible to cheat the image processing system for identifying a person by use of a picture of his skin.

According to some embodiments the real skin map may be generated by multispectral or hyperspectral skin detection.

In some embodiments the real skin map may be generated by generating a first skin map based on the spectral image, the first skin map indicating for each preset area of the spectral image split into preset areas whether the preset area is related to skin or not, receiving a RGB image e.g. obtained by a RGB camera, generating a second skin map based on the RGB image obtained from the RGB camera, the second skin map indicating for each preset area of the RGB image split into preset areas whether the preset area is related to skin or not; and generating the real skin map by combining the first skin map generated based on the spectral image and the second skin map generated based on the RGB image, wherein identifying the person is based on the real skin map. The image processing system for identifying a person may thus combine RGB skin detection with multispectral skin detection or hyperspectral skin detection.

In some embodiments of the processor of the image processing system for identifying a person may be configured to perform the image processing method which may include generating the second skin map based on the spectral image based on a machine learning model. For example, the machine learning model is an AdaBoost algorithm, a C5 algorithm, a neural network or the like. The machine learning model may be implemented as software.

In some embodiments the machine learning model may be trained in advance on the basis of a set of training samples. Each training sample may include a spectral image e.g. obtained by a spectral camera and a corresponding classifier which indicates if the spectral image is associated to skin or not. Alternatively, each training sample may include an image section of the spectral image obtained from the spectral camera and a corresponding classifier which indicates if the images section is associated to skin or not. For example, training the machine learning model may include for each training sample receiving a RGB image of the training sample, determining based on the RGB image, whether the training sample is skin-coloured or not, and receiving a classifier which indicates whether the training sample is associated to real human skin or not, if it is determined that the training sample is skin-coloured. For determining based on the RGB image, whether the training sample is skin-coloured or not, a RGB skin detection model may be used, e.g. an algorithm capable of determining, whether the training sample is skin-coloured or not. The classifier may be entered manually by a user intending to train the machine learning model or may be provided automatically. Furthermore, training the machine learning model may include for each training sample receiving a spectral image of the training sample, if it is determined that the training sample is skin-coloured. Dependent on the used machine learning model pre-processing the spectral image of the training sample may be suitable. Pre-processing the spectral image of the training sample may be performed analogously to pre-processing the spectral image of the person's skin explained below. In some cases spectral data may be extracted from the spectral image. Then, the classifier and the spectral image (or the spectral data thereof) corresponding to the same training sample may be associated to create the trained machine learning model.

Training the machine learning model may be summarized in the following way: RGB skin detection is used to create maps of "real" skin and "fake" skin, the "fake" skin representing something other than real human skin. These maps may be manually identified and used as training set for a classifier, which has as an additional input for the "real" skin and "fake" skin a spectral image or spectral data coming from a specialized single camera or several cameras. After training, a model may be obtained being capable of spectral skin detection.

In some embodiments the image processing system for identifying a person may have means configured to post-filter the real skin map. The means configured to post-filter, for example, may include a morphological filter (opening) applied in order to remove small misdetection areas may be used.

In some embodiments the image processing system for identifying a person may include means configured to pre-process the received spectral image. Pre-processing may be suitable in situations where the spectral raw data (spectral image) is not reliable for identifying the person. This can happen for example, if the person has an excessive sun bathing behind him or if the person is ill and a composition of his blood has therefore changed. In such situations changes can be observed in human skin reflectance curves. This can be handled by using relative inputs for the identification processes itself. Meaning in detail, relative quantities like differences or ratios amongst the reflectance could be used. Pre-processing can include e.g. spectral content removal up to combining different spectral channels as for example by division, subtracting or the like. During generating the second skin map and/or during training the machine learning model pre-processing may include preparing spectral data such that it is more suitable for the machine learning model than the received spectral image.

Generating the real skin map may be summarized in the following way: RGB skin detection is used for performing a first selection between something like skin and anything else. In parallel, for the same scenery but this time based on a spectral image or spectral data, a skin detection based on a trained machine learning model is conducted. Then, a following discriminator does the final decision between "real" skin and "fake" skin by a logical combination of both detection results, e.g. the RGB based skin map and the spectral based skin map.

In some embodiments the image processing system for identifying a person may include a filter for filtering the first spectral image based on the skin map, the first skin map, the second skin map and/or the real skin map, wherein the processor is configured to identify the person is further based on the filtered spectral image. The filtered spectral image may include mainly preset areas representing real human skin.

In some embodiments the processor of the image processing system for identifying a person may be configured to perform the image processing method which may include receiving a further spectral image (also denoted as "second spectral image") from a further spectral camera and filtering the second spectral image based on the real skin map, wherein identifying the person is further based on the filtered spectral image. The filtered spectral image may include mainly preset areas representing real human skin. Filtering the first spectral image or the second spectral image results in that the preset areas not related to skin are not analysed and the effort is thus reduced.

In some embodiments the skin reflectance information used as basis for identifying the person may include skin reflection information of registered users stored in a database. E.g. the skin reflection information of each registered user stored in the database may be a spectral image of human skin of each registered user stored in the database or spectral data of human skin of each registered user stored in the database. The spectral data may be a reflectance data of the registered user's skin, e.g. an averaged reflectance of the registered user's skin. The skin reflection information of registered users is registered in advance, wherein for example the skin reflectance information of a registered user's skin is associated to a user identification indicating the user.

In some embodiments the processor may be configured to perform the image processing method which may include identifying the person by comparing the received spectral image of the person's skin with the skin reflection information of each registered user. For example, the spectral image of the person's skin may be compared to a spectral image of human skin of each registered user or spectral data extracted from the spectral image of the person's skin, e.g. a pixel by pixel reflectance of the person's skin or an average reflectance of the person's skin, may be compared to the skin reflectance information of each registered user, e.g. an averaged reflectance of human skin of each registered user. Furthermore, the processor of the image processing system for identifying a person may further be configured to perform the image processing method which may include identifying the person as at least one of the registered users, if the received spectral image matches with the skin reflectance information of the at least one of the registered users. The spectral image of the person's skin may be the first spectral image or the second spectral image. The spectral image may be pre-processed in the way explained above.

Comparing the received spectral image of the person's skin with the skin reflectance information of registered users may include performing a direct comparison of the received spectral image of the person's skin with the skin reflectance information of each registered users. Alternatively, classifiers which were trained in advance, e.g. an Adaboost algorithm, a C5 algorithm, a neural network or the like, may be used for comparing the spectral image of the person's skin with the skin reflectance information of each registered user. In case of the classifiers a model may be loaded covering the trained characteristics of users registered so far. The processor may further be configured to output after identifying the person as one of the registered user a unique user ID related to this registered user.

Comparing the received spectral image of the person's skin with the skin reflection information of each registered user may include determining for the spectral data of each of the registered users a difference between the spectral image of the user's skin and the skin reflection information of each registered user, selecting the skin reflection information of a registered user, which shows minimal differences compared to the spectral image of the person's skin and determining if the selected skin reflectance information fulfils threshold requirements. The differences between the spectral image of the user's skin and the skin reflectance information of each registered user may be determined on the basis of spectral data, e.g. a reflectance. The spectral data may be extracted pixel by pixel or for predetermines regions of the spectral image or of the whole spectral image of the person's skin.

If the received spectral image of the person's skin does not match with the spectral data of human skin of one of the registered users, there are two situations distinguished.

In some embodiments the processor may be configured to perform the image processing method which may include identifying the person by determining that the person is not a registered user, if the received spectral image of the person's skin does not match with the skin reflectance information of one of the registered users. This situation may be considered as normal identification mode. After determining that the person is not registered no user ID is output by the processor.

In some embodiments the processor may be configured to perform the image processing method which may include identifying the person by registering the person as registered user, if the received spectral image of the person's skin does not match with the skin reflectance information of one of the registered users. This situation may be considered as acquisition mode. For registering the person the processor may be configured to perform the image processing method which may include adding the spectral image of the person's skin or a spectral data extracted from the spectral image of the person's skin and an indication of the person assigned to the spectral image of the person's skin (or to the spectral data of the persons' skin) to a database for storing skin reflectance information of each registered user. In case that classifiers are used for comparing the spectral image of the person's skin with the skin reflectance information of each registered user, the classifier may be retrained. After registering the person as new user to the database or model also here an ID related to the added user is output by the processor.

In some embodiments the spectral image may include spectral reflectance data. The spectral image can be based on radiation of a predetermined wavelength or wavelength range within the visible spectrum. For example, the spectral image may include a reflectance of the person's skin for radiation of a predetermined wavelength within the visible spectrum, a detail of a reflectance spectrum of the person's skin for radiation of a predetermined wavelength range within the visible spectrum or the reflectance spectrum of the person's skin for radiation of a predetermined wavelength range within the visible spectrum.

The spectral image may be based on reflected ambient light. E.g. ambient light may be reflected by the person's skin and the reflected ambient light is received as spectral image.

In some embodiments the processor of the image processing system for identifying a person may be configured to perform the image processing method which may include evaluating the result of identifying the person as at least one of the registered users, e.g. the output user ID. For example, if the person is identified as more than one user, a most probable user from the registered users may be derived and the person may be identified as the most probable user. Furthermore, from time to time it can happen that there is a failure in the identification. By a continuous running identification process many identification results are provided. A certain amount of these results from the past may be stored and evaluated to derive the most probable user. The evaluation can be achieved for example by performing a histogram based evaluation and selecting the user with most hits. Alternatively, it can also be a more advanced evaluation applying weightings to each result to do a more complex statistical evaluation. This weighted evaluation approach is especially of interest, if classifiers are used for identification, as here some classifiers could return two different users for the same input set of spectral data.

The above described image processing system for identifying a person allows a remote identification of persons by utilizing their spectral skin characteristics and requires no direct interaction with the sensing system. Furthermore, as the method can include real human skin detection, it is less cheatable as other biometric identification approaches.

The above described image processing system for identifying a person may be used in the field of smart home operation. There, for example, a projector system allows humans to interact with a virtual display using hands and fingers. In such an environment access to projected windows or other virtual objects of the virtual display can be controlled by a user identification process like the described method running all the time in the background. Alternatively, the image processing system for identifying a person may be used in the field of gaming. There, people often have to login to games, for example played with a gaming console just with their skin characteristics. Movements or gestures can here be easily assigned by the skin-based user identification. This could increase the fun factor as no additional devices would be required to be worn by users normally accomplishing this. Furthermore, completely new gaming scenarios are thinkable.

For example, the image processing system may include an identification unit adapted to identify the person based on the received spectral image of the person's skin, a pre-processing unit adapted to pre-process the receives spectral image before identifying the person based on the received spectral image of the person's skin and/or an evaluation unit adapted to evaluate the result of identifying the person. The image processing system may further include a skin detection unit adapted to provide a skin map, e.g. a RGB-based skin map, a spectral-based skin map or a real skin map as described above. In this case, the identification unit may be adapted to identify the person based in the skin map. The pre-processing unit, the identification unit, the evaluation unit and/or the skin detection unit may be implemented as software which can be executed by the processor.

In some embodiments the image processing system may further include the spectral camera configured to provide the spectral image of the person's skin. The spectral camera may be a conventional spectral sensing system. The spectral camera may be a multispectral camera or a hyperspectral camera. The multispectral camera may include several black and white cameras, e.g. four black and white cameras, each provided with an individual colour filter. The individual colour filters are configured to pass radiation of different wavelengths. The multispectral image of such a multispectral camera may be an image indicating for each pixel the reflectance of the person's skin at different wavelength in the visible spectrum.

In some embodiments the image processing may further include a RGB camera configured to provide an RGB image. In an analogues way to the RGB camera any other colour camera such as a CMYK camera or the like can be used. Alternatively, the image processing system may be wired or wirelessly connected to a RGB camera. In these cases, the processor may be configured to generate a RGB-based skin map or a real skin map based on the spectral image and the RGB image and to identify the person base on the RGB-based skin map or the real skin map, respectively.

The spectral camera and/or the RGB camera may be positioned remote from the person's skin. For example, the spectral camera and/or the RGB camera are placed in a corner of a room, while the person is situated in a middle of the room or in an opposite corner of the room. The RGB camera and the spectral camera are positioned so that the spectral image and the RGB image represent an identical scenery or a similar scenery, e.g. a person's skin in an environment.

In some embodiments the image processing system may further include a storage device configured to store a database including spectral information on human skin of registered users. Furthermore, the storage may be configured store a trained machine learning model applicable to generate the skin map.

In some embodiments the image processing system for identifying a person may include a user interface or may be connected to a user interface. An input via the user interface may cause the processor to start the acquiring mode explained above, which allows the registration of a new user. Furthermore, the image processing system may include a display device or may be wired or wirelessly connected to a display device to display a user ID, if the person is identified as registered user and/or a user message indicating whether the person is a registered user or not.

The image processing system for identifying a person may be one selected from a projector system, a mobile digital media player, a smart-television, a smart phone, a tablet computer, a portable game console, a smart watch, an electronic wristband, smart glasses or an e-book reader. The projector may be used in smart home applications, gaming applications and other applications requiring user identification. For example, the projector may be a table top projector.

A method for identifying a person comprises receiving a spectral image of a person's skin, e.g. obtained by a spectral camera, and identifying the person based on the received spectral image of the person's skin and skin reflection information. The method may further comprise any of the process features described above with respect to the image processing system separately or in combination with one or more others of the above described process features.

In the following image processing methods and image processing systems for generating an real object map such as a real skin map or a real item map are described which are based on a spectral image and a RGB image. As spectral characteristics, e.g. a reflectance of an object's surface like human skin or a surface of a real natural item, differs from that of a fake object such as fake skin or a fake item, the combined use of spectral images and RGB images allows a reliable detecting of the real object such as real human skin or the real natural item. The real natural item may be a plant, e.g. a leave, a fruit or a vegetable, an animal or the like.

In the following optional process features of the image processing systems and methods for generating a real object map are explained with respect to an image processing system. However, each of these process features, separate or in combination with one or more other features, is to be understood as feature of an image processing method as well.

A image processing system for generating a real object map based on a RGB image and a spectral image includes a processor configured to perform the image processing method including receiving a spectral image, e.g. obtained by a spectral camera, generating a first object map (spectral-based object map) based on the spectral image, the spectral-based first object map indicating for each preset area of the spectral image split into preset areas whether the preset area is related to a real object or not, receiving an RGB image from a RGB camera, generating a second object map (RGB-based object map) based on the RGB image obtained from the RGB camera, the second object map indicating for each preset area of the RGB image split into preset areas whether the preset area is related to the object or not, and generating the real object map by combining the first object map generated based on the spectral image and the second object map generated based on the RGB image. The single steps of the method for generating a real skin map are explained in detail above with respect to the method for identifying a person and can be analogously applied.

In the following the features of the image processing system for generating a real object map are explained with respect to generating a real skin map. However, the all features may be analogously transferred to the generation of another real object map such as a real item map.

In some embodiments of the image processing system for generating a real skin map the processor may be configured to perform the image processing method which may include generating the second skin map based on a machine learning model, e.g. an AdaBoost algorithm, a C5 algorithm, a neural network or the like. In some embodiments the machine learning model may be trained in advance on the basis of a set of training samples, wherein each training sample may include a spectral image obtained from a spectral camera and a corresponding classifier which indicates if the spectral image is associated to skin or not. The training may be performed as explained above.

In some embodiments the processor of the image processing system for generating a real skin map may be configured to perform the image processing method which may include pre-processing the spectral image and/or post-filtering the real skin map. With respect to details of pre-processing and post-filtering it is referred to the above explanations.

The above described image processing system for generating a real skin map allows differentiating real skin versus fake skin and can be used as a simple add-on or bolt-on solution for existing skin detection systems.

Generally, there is a variety of possible applications for the above described image processing system for generating a real skin map ranging from automotive to surveillance. In case of automotive, reliable skin detection may help to avoid collisions with human beings and thus increases overall safety in road traffic. In surveillance, reliable skin detection can help to suppress false alarms and also reduces complexity of safety systems as no motion detection is required anymore. Just the sudden appearance of human skin in a monitored area may then be enough for initiating an alarm.

As already mentioned above, the image processing system for generating a real object map may be analogously applied for generating a real item map instead of the real skin map. The real item may be a natural item such as a plant, e.g. a leaf, a fruit or a vegetable, an animal, or the like and the real item map may identify an item as real natural item in contrast to a fake item, e.g. a picture of a real natural item or an artificial item. The image processing system may be used in agriculture application.

In some embodiments the image processing system for generating a real skin map may include a spectral camera configured to provide the spectral image of the person's skin, e.g. a multispectral camera or a hyperspectral camera, and/or a RGB camera configured to provide an RGB image. Alternatively, the image processing system may be connected to the spectral camera and/or the RGB camera. The spectral camera and the RGB camera may be configured and/or arranged as described with respect to the image processing system for identifying a person.

In some embodiments the image processing system may include a storage device for storing e.g. the machine learning model.

The image processing system for generating a real object map may be one selected from a projector system, a mobile digital media player, a smart-television, a smart phone, a tablet computer, a portable game console, a smart watch, an electronic wristband, smart glasses or an e-book reader. The projector may be used in smart home applications, gaming applications and other applications. For example, the projector may be a table top projector.

A image processing method for generating a real object map based on a RGB image and a spectral image includes receiving a spectral image, e.g. obtained by a spectral camera, generating a first object map (spectral-based object map) based on the spectral image, the spectral-based first object map indicating for each preset area of the spectral image split into preset areas whether the preset area is related to a real object or not, receiving an RGB image, e.g. obtained by a RGB camera, generating a second object map (RGB-based object map) based on the RGB image, the second object map indicating for each preset area of the RGB image split into preset areas whether the preset area is related to the object or not, and generating the real object map by combining the first object map generated based on the spectral image and the second object map generated based on the RGB image. The image processing method may further comprise any of the process features described above with respect to the image processing system separately or in combination with one or more others of the above described process features.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Embodiments are now described with reference to the drawings.

FIG. 1 schematically illustrates an embodiment of an image processing system in form of a smart television (smart TV 1) configured to identify a person (not shown) situated in front of the smart TV 1 based on a multispectral image of the person's skin. The smart TV 1 includes a display screen 10, an RGB camera 11 and identification means for identifying the person. The identification means include a multispectral camera 20 and a processor 21. The RGB camera 11 is configured to take an RGB image of the person situated in from to the display screen 10 and the multispectral camera 20 is configured to take a multispectral image of the person situated in from to the display screen 10. Thus, the RGB image and the multispectral image represent in identical scenery.

Figure 2:
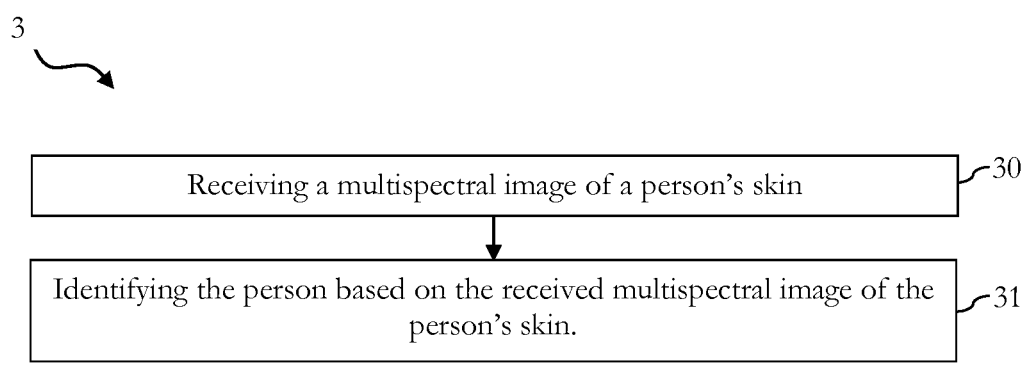
FIG. 2 schematically illustrates an image processing method for skin-based user-identification.

FIG. 2 schematically illustrates a method 3 for identifying the person situated in front of the smart TV 1. At 30 the multispectral image of the person's skin is received from the multispectral camera 20. The multispectral image of the person's skin has a plurality of pixels and each pixel includes multispectral information on the person's skin, e.g. a reflectance curve of the person's skin.

Figure 3:
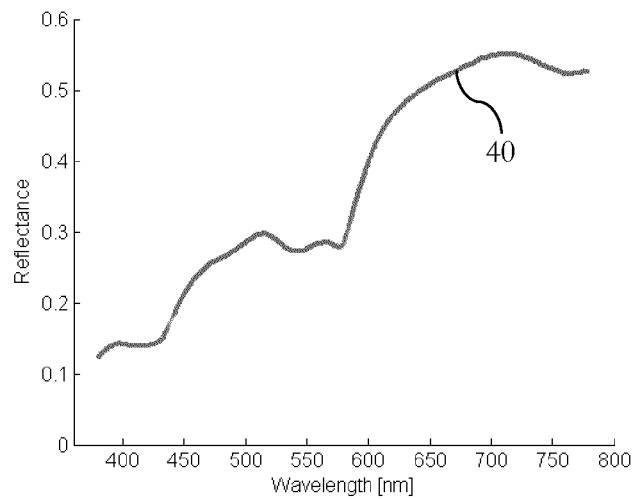
FIG. 3 schematically illustrates a wavelength-dependent reflectance of the person's skin.

A typical example of a reflectance curve 40 of a pixel representing the person's skin is schematically illustrated by FIG. 3. The reflectance curve 40 indicates for each wavelength in the visible spectrum a reflectance value. In a wavelength range from 500 nm to 600 nm the reflectance curve 40 shows a "w"-structure, which is typical for the reflection of human skin.

At 31 the person is identified based on the received multispectral image of the person's skin received form the multispectral camera. In particular, the person is identified based on the reflectance of each pixel of the received multispectral image representing the person's skin. This is explained in detail with reference to FIGS. 5 to 10 below.

First Embodiment

Skin-Based User Identification

Figure 4:
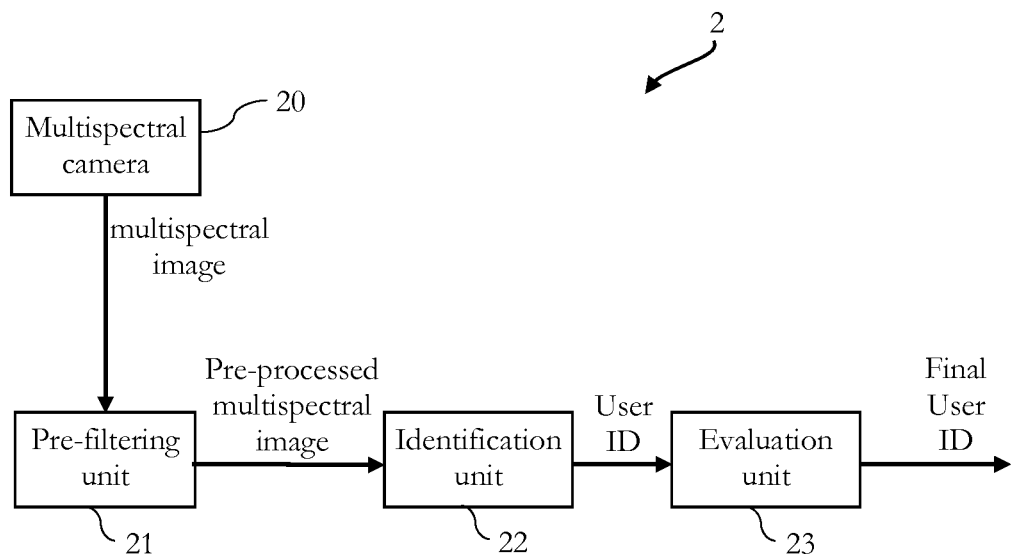
FIG. 4 schematically illustrates a first embodiment of an image processing system for identifying a person based on a multispectral image of the person's skin.

FIG. 4 schematically illustrates a first embodiment of identification means 2. The identification means 2 include the multispectral camera 20 for taking the multispectral image of the persons' skin, a pre-filtering unit 21, an identification unit 22 and an evaluation unit 23.

The pre-filtering unit 21 is connected to the multispectral camera 20 to receive the multispectral image of the person's skin. The pre-filtering unit 21 is configured to pre-process the multispectral image. The identification unit 22 is adapted to receive the pre-processed multispectral image, to identify the person as registered user based on the preprocessed multispectral image of the person's skin and to output a user ID. The evaluation unit 23 is adapted to receive the user ID, to verify the user ID and to output a final user ID.

Figure 5:
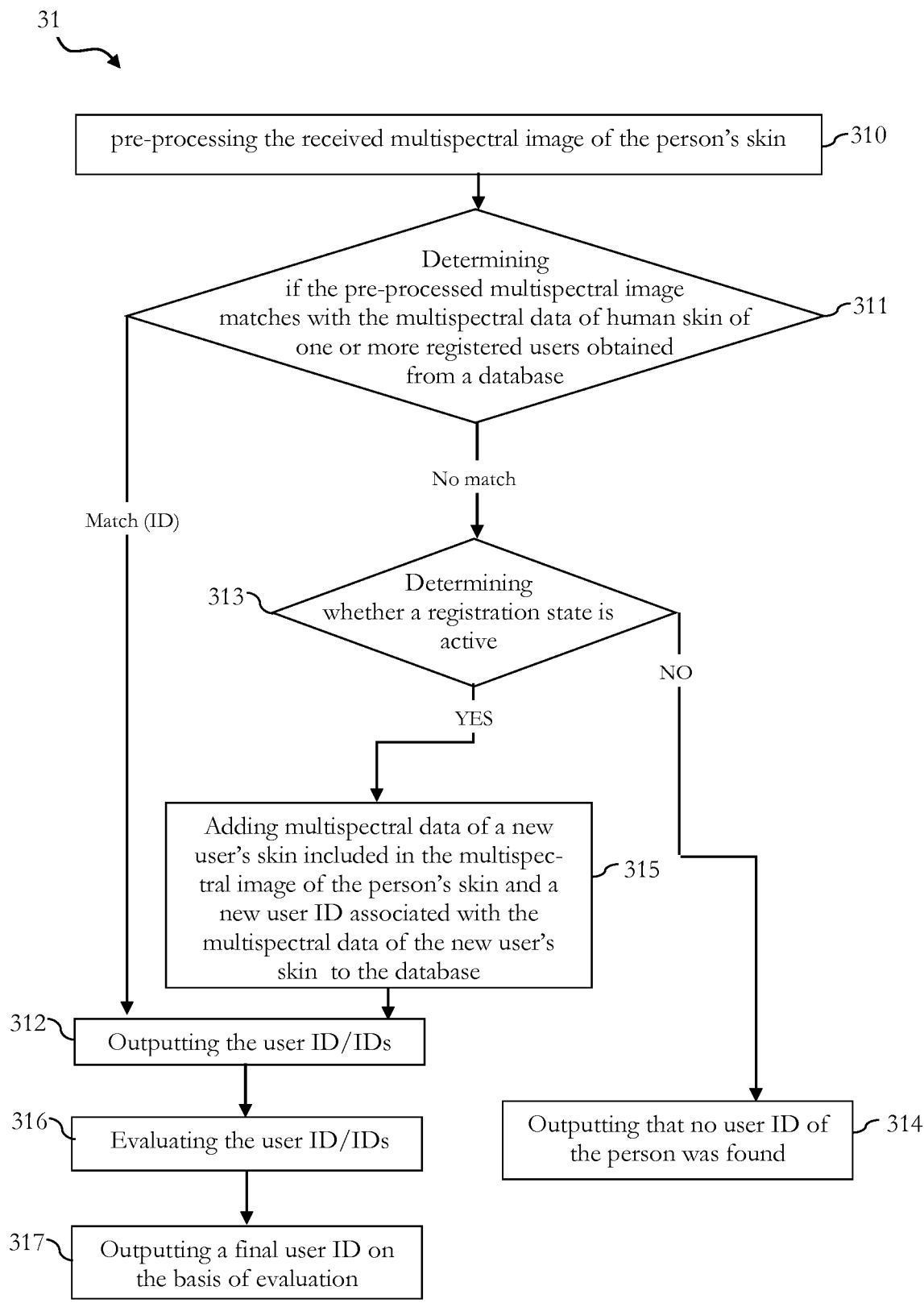
FIG. 5 schematically illustrates an image processing method for identifying a person based on a multispectral image of the person's skin.

FIG. 5 schematically illustrates a method 31 for identifying the person based on the received multispectral image of the person's skin using the identification means 2 illustrated in FIG. 4.

At 310 the received multispectral image of the person's skin is pre-processed by the pre-filter unit 21. During pre-processing temporal changes of the appearance of the person's skin like a sun burn or a thickness are recognized and the multispectral image is adapted in accordance with the temporal change of the skin appearance. This is done by spectral data removal up to combining different spectral channels by dividing or subtracting.

At 311 it is determined if the pre-processed multispectral image of the person's skin matches with multispectral data of human skin of one or more registered users obtained from a database. This is explained in detail with reference to FIG. 6 below.

If it is determined at 311 that the pre-processed multispectral image of the person's skin matches with the multispectral data of human skin of one or more registered users the user ID associated to the multispectral data, with which the pre-processed multispectral image of the person's skin matches, is output at 312.

If it is determined at 311 that the pre-processed multispectral image of the person's skin does not match with the multispectral data of human skin of one or more registered users it is determined at 313 whether a registration state is active or not. In the registration state registration of new users is possible.

If it is determined at 313 that no registration state is active, it is output at 314 that no user ID of the person was found.

If it is determined at 313 that the registration state is active a multispectral data of the new user's skin included in the multispectral image of the person's skin and a new user ID assigned to the multispectral data of the new user's skin is added to the database for storing the multispectral data for human skin of registered users at 315.

The new user ID associated with the multispectral data of the new user's skin included in the multispectral image of the person's skin is then output at 312.

At 316 the one or more user ID output at 312 are evaluated as they may faulty. This is done by continuous running the identification process and storing many identification results. The stored results are evaluated to derive the most probable user and to provide a final user ID.

At 317 the final user ID is output.

Figure 6:
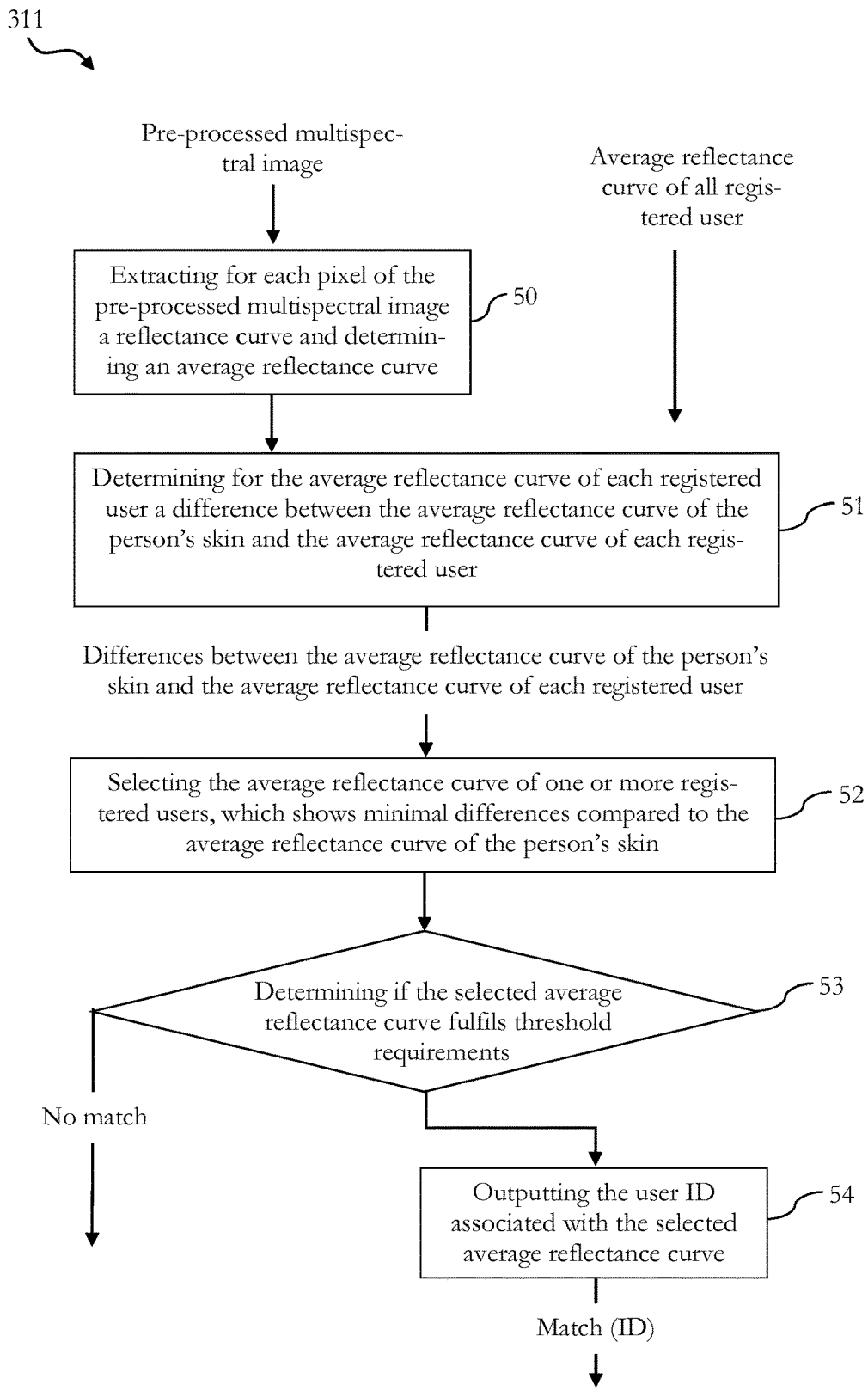
FIG. 6 schematically illustrates a wavelength-dependent reflectance of human skin of different registered users.
Figure 7:
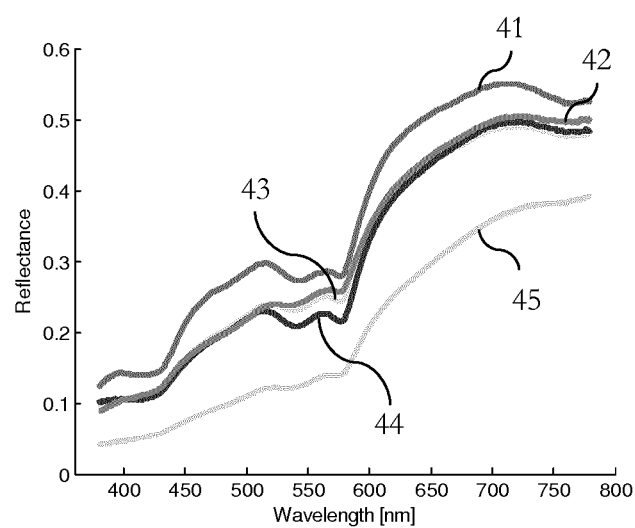
FIG. 7 schematically illustrates an image processing method for determining if the reflectance of the person's skin matches with a reflectance of human skin of one or more registered users.

FIG. 6 schematically illustrates an example of determining 311 if the pre-processed multispectral image of the person's skin matches with multispectral data of human skin of one or more registered users obtained from a database. In the example of FIG. 6 the multispectral data of human skin of the registered user includes an average reflectance curve 41-45 schematically illustrated by FIG. 7. The reflectance curves 41-45 all show the "w"-structure but vary with respect to an intensity of reflectance from person to person.

At 50 for each pixel of the pre-processed multispectral image representing the person's skin a reflectance curve 40 as for example shown in FIG. 3 mentioned above is extracted and an average reflectance curve of the person's skin is determined based on the reflectance curves of the pixels.

At 51 for the average reflectance curve 41-45 of human skin of each registered user a difference (e.g. a deviation) between the average reflectance curve of the person's skin and the average reflectance curve 41-45 of human skin of each registered user is determined by subtracting the average reflectance curve of the person's skin from the average reflectance curve 41-45 of the human skin of each registered user.

At 52 the average reflectance curve 41-45 of human skin of one or more registered users, which shows minimal differences compared to the average reflectance curve of the person's skin, is selected.

At 53 it is determined if the selected average reflectance curve 41-45 of human skin of the one or more registered users fulfils threshold requirements. Therefore, the difference between the average reflectance curve of the person's skin and the selected average reflectance curve 41-45 of human skin received at 51 is compared to a threshold.

If the selected average reflectance curve of human skin of at least one registered users fulfils the threshold requirements at 53 the user ID associated with the selected average reflectance curve is output at 54. Thus, the result of determining 31 if the pre-processed multispectral image of the person's skin matches with multispectral data of human skin of one or more registered users obtained from a database is "Match (ID)", indicating that there is a match and the user ID associated with this match.

If the selected average reflectance curve of human skin of none of the registered users fulfils the threshold requirements at 53 the result of determining 31 if the pre-processed multispectral image of the person's skin matches with multispectral data of human skin of one or more registered users obtained from a database is "No Match".

Sometimes reflectance of human skin of two or more registered users can be selected at 51. If at least the selected average reflectance curve of human skin of one registered user fulfils the threshold requirements, the result of determining 31 if the pre-processed multispectral image of the person's skin matches with multispectral data of human skin of one or more registered users obtained from a database is "Match (ID)".

Second Embodiment

Skin Detection

Figure 8:
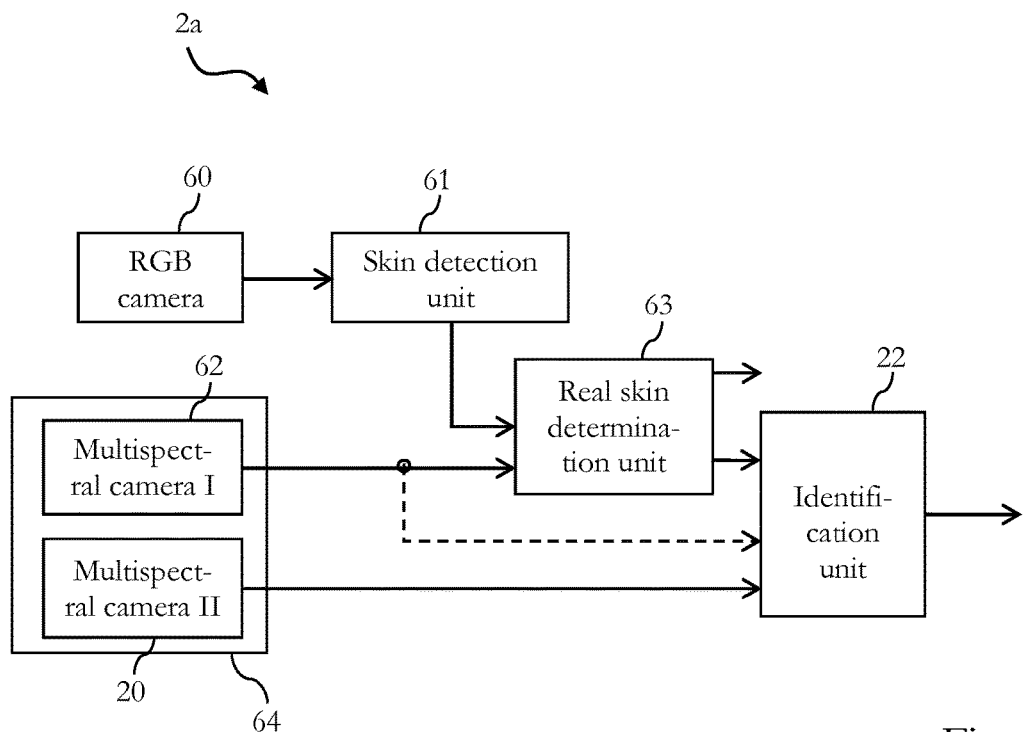
FIG. 8 schematically illustrates a second embodiment of an image processing system for identifying a person based on a multispectral image of the person's skin.

FIG. 8 schematically illustrates a second embodiment of identification means 2a. The identification means 2a include skin detection means, a multispectral camera (identification multispectral camera 20) for taking a first multispectral image of the persons' skin and an identification unit 22. The detection means include a RGB camera 60, a skin detection unit 61, a multispectral camera 62 (skin detection multispectral camera 62) and a real skin determination unit 63.

The RGB camera 60 is configured to take a RGB image of the person's skin. The skin detection unit 61 is configured to receive the RGB image from by the RGB camera and to determine for each pixel of the RGB image, whether the pixel is skin-coloured or not, and to provide a skin map indicating for each pixel of the RGB image, whether the pixel is skin-coloured or not. The skin detection multispectral camera 62 is configured to provide a second multispectral image of the person's skin showing a scenery identical to that shown by the RGB image. The skin detection multispectral camera 62 includes four black and white cameras with different wavelength filters. The number of four black and white cameras is exemplary and may vary in other embodiments. The wavelength filters are chosen in a way to allow suitable distinction on whether a pixel of the second multispectral image represents real human skin or fake skin, e.g. a picture of human skin or a skin-coloured object other than skin. Accordingly, the second multispectral image includes for each pixel the reflectance information provided by the four black and white cameras. The real skin determination unit 63 is configured to provide based on the skin map provided by the skin detection unit 61 and the second multispectral image received from the skin detection multispectral camera 62 a real skin map.

The identification multispectral camera 20 includes four black and white cameras with different wavelength filters. The wavelength filters are chosen in a way to allow suitable distinction of reflectance characteristics of human skin. The skin detection multispectral camera 62 and the identification multispectral camera 20 are incorporated in a multispectral camera apparatus 64.

The identification unit 22 is adapted to receive the real skin map, the first multispectral image from the identification multispectral camera 20 the second multispectral image from the skin detection multispectral camera 62, to identify the person as registered user and to output a user ID or an indication that there is no user ID. The identification unit 22 is configured to filter the first multispectral image from the identification multispectral camera 20 on the basis of the real skin map, so that only pixels of the first multispectral image representing real human skin are used for identifying the person based on the person's skin. The identification unit 22 is further configured to identify the person based on the filtered multispectral image in a way as explained in detail with respect to FIG. 5 and FIG. 7 above.

Operation Phase 7

In the following an operation phase 7 performed by skin detection means is explained with respect to FIG. 9. This operation phase may be performed by identification means 2a during identifying a person or by separate skin detection means for generating a real skin map, wherein the separate skin detection means are configured like the skin detection means included in the identification means 2a of FIG. 8.

At 70 an RGB image of an environment, e.g. a space in front for the smart TV 1, is received from the RGB camera 60. The RGB image includes a plurality of pixels, each pixel including RGB information.

At 71 it is determined for each pixel of the RGB image on the basis of RGB information of the pixel whether the pixel is skin-coloured or not and a first skin map is generated indicating for each pixel, whether it is a skin-coloured pixel or a non-skin-coloured pixel.

At 72 a multispectral image of the environment presented by the RGB image is received from the skin detection multispectral camera 62. The second multispectral image includes a plurality of pixels, each pixel including reflectance curve. For pixels representing real human skin the reflectance curve may have a form as presented by FIG. 3 above.

At 73 the skin detection multispectral image is pre-processed. During pre-processing temporal changes of the appearance of the skin like a sun burn or a thickness is recognized and the multispectral image is adapted in accordance with the temporal change of the skin appearance.

At 74 each pixel of the pre-processed multispectral image is classified as pixel representing human skin or as pixel representing something other than real human skin using an AdaBoost algorithm. Classifying the each pixel at 74 is based on a machine learning model 75, which is trained as will be explained with respect to FIG. 10 below. As result of classifying the reflectance information of each pixel a second skin map is provided.

At 76 the first skin map provided at 71 and the second skin map provided at 74 are added using a discriminator. In case that a pixel of the RGB image is skin-coloured and the corresponding pixel of the multispectral image includes a reflectance curve similar to that of real human skin, it is determined that the corresponding pixels represent real human skin. Otherwise, it is determined that the corresponding pixel does not represent real human skin.

At 77 a real skin map is output indicating for each pixel, whether it represents real human skin or not.

Training Phase 8

Figure 9:
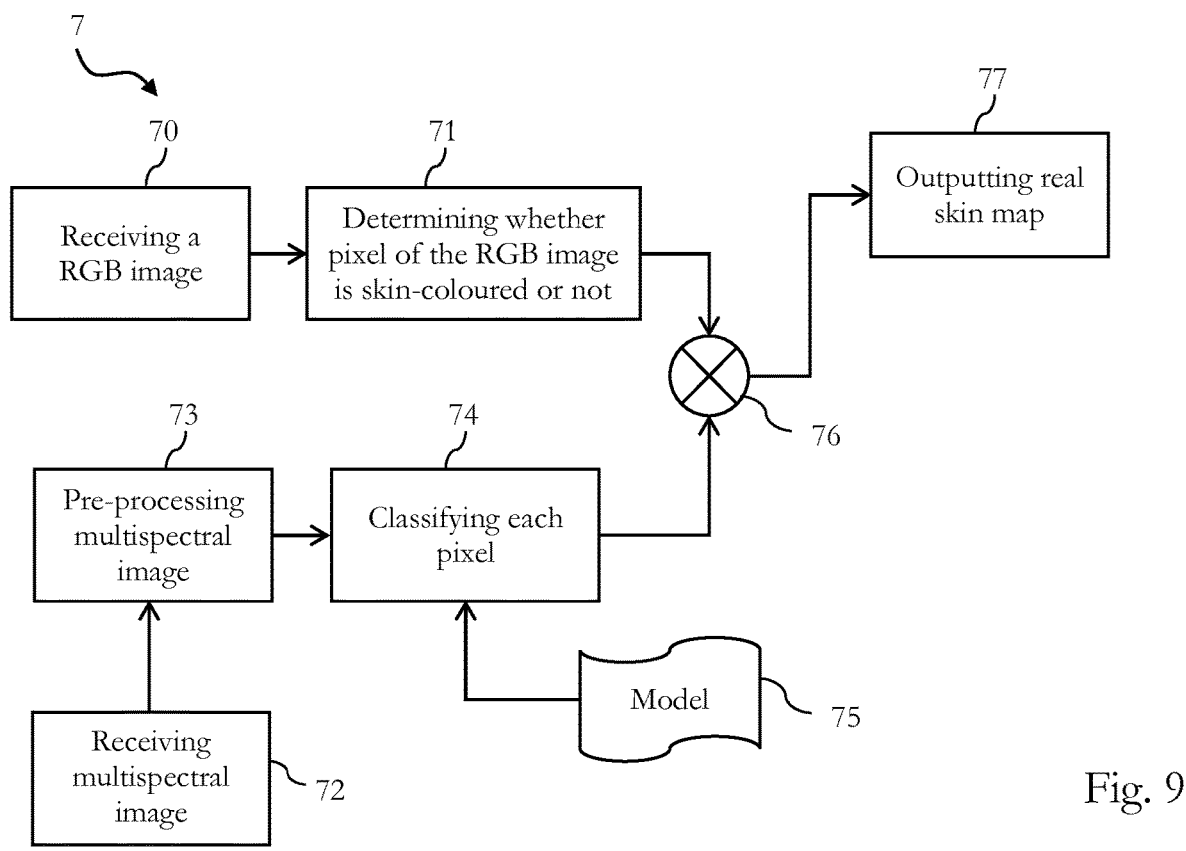
FIG. 9 schematically illustrates an image processing method for generating a real skin map based on a trained machine learning model.
Figure 10:
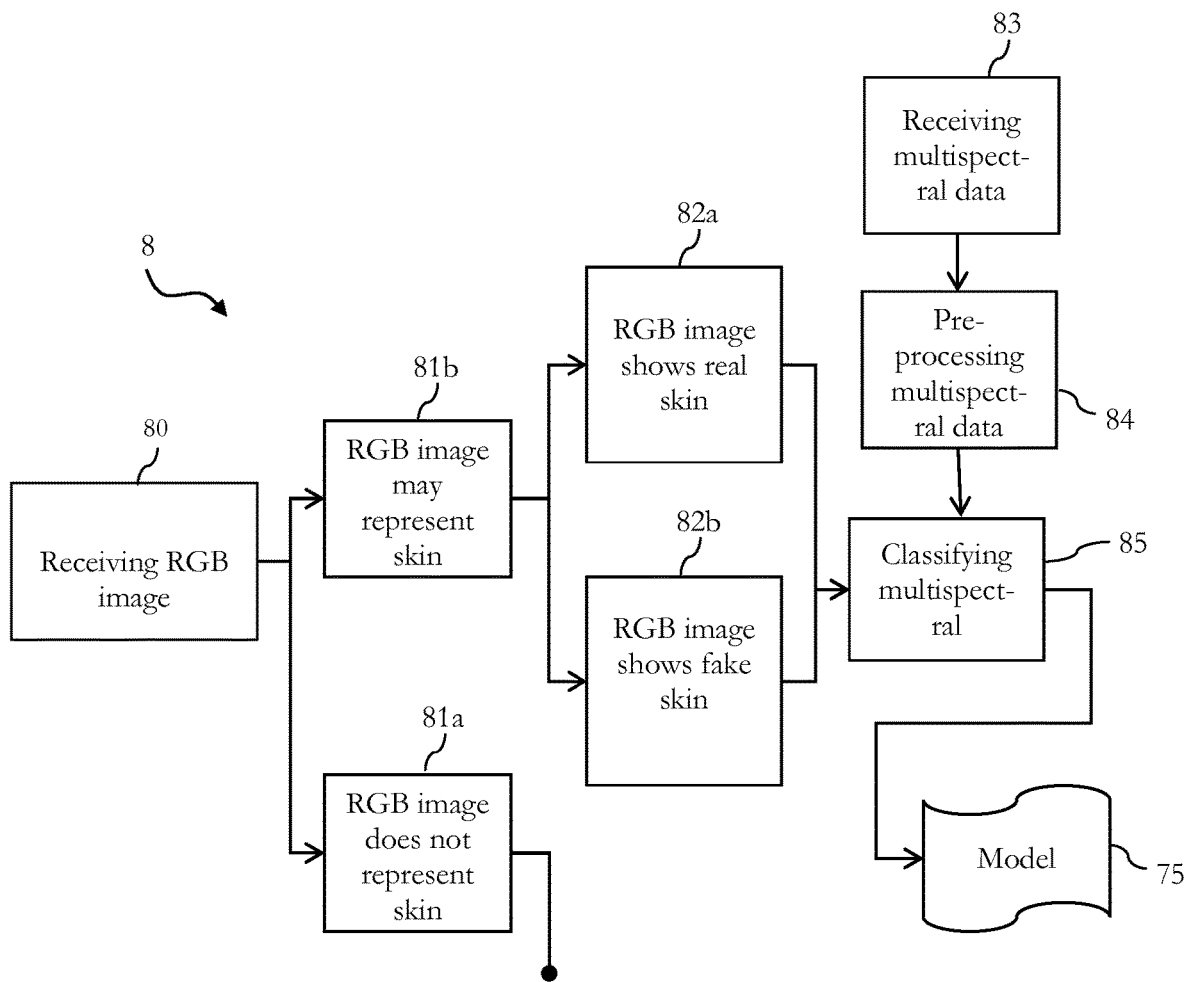
FIG. 10 schematically illustrates a method for training a machine learning model.

FIG. 10 schematically illustrates a training phase 8 of the machine learning model 75 of FIG. 9. The training phase is based on a set of training samples, wherein each training sample includes multispectral data of a multispectral image obtained from a multispectral camera and a corresponding classifier which indicates if the multispectral data is associated to real human skin or not.

At 80 for each training sample an RGB image is obtained from an RGB camera. Based on the RGB image it is determined, whether the training sample is skin-coloured or not.

If the training sample is not skin-coloured it is output at 81a that the RGB image does not represent skin. The RGB image of a training sample which does not represent skin is not considered for training the machine learning model 75.

If the training sample is skin-coloured it is output at 81b that the RGB image may represent skin.

For the RGB image of a training sample, which may represent skin, a classifier indicating that the training sample is real human skin is manually input at 82a or a classifier indicating that the training sample is fake skin (not real human skin) is manually input at 82b.

At 83 multispectral data of the training sample is received. The multispectral data is extracted from a multispectral image obtained from a multispectral camera.

At 84 the multispectral data is pre-processed analogues to pre-processing 73 the multispectral image during the training phase explained with respect to FIG. 9.

At 85 the pre-processed multispectral data is classified based on the classifier input at 82a or at 82b. After classifying the multispectral data of the training sample the multispectral data associated with the classifier input at 82a and 82b is stored to build the trained machine learning model 75.

This procedure at 82a to 85 is carried out for all training samples for which it is output at 81a that they may represent skin.

Figure 11:
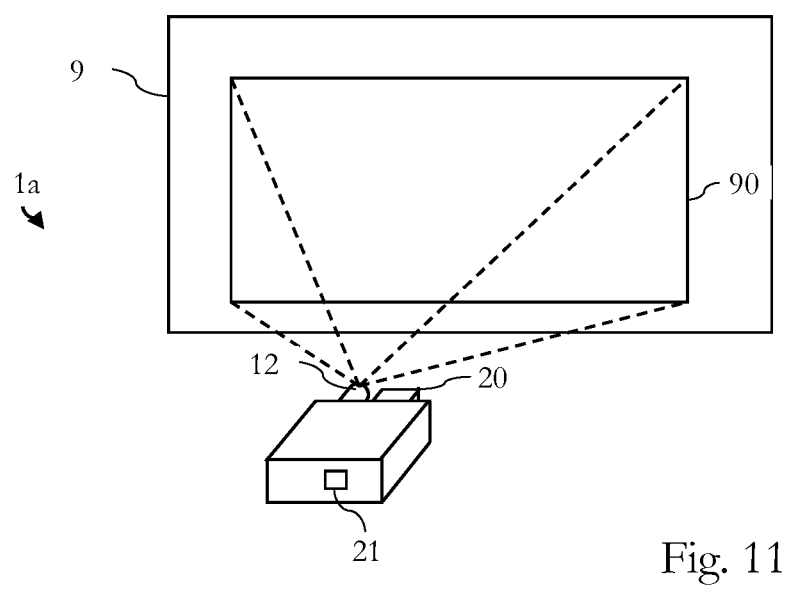
FIG. 11 schematically illustrates an image processing system in form of a table type projector which is configured to identify a person based on a multispectral image of the person's skin.

FIG. 11 schematically illustrates an embodiment of an image processing system in form of a table top projector 1a configured to identify a person (not shown) based on a multispectral image of the person's skin. The table top projector 1 is arranged above a table 9 used as touch sensitive display. The table to projector 1a includes a lens system 12 for projecting an image 90 onto the table 9. The table top projector 1a further includes identification means for identifying the person. The identification means include a multispectral camera 20 and a processor 21. The multispectral camera 20 is configured to take a multispectral image of the person's hand situated above the table 9. The identification means may further have a RGB camera (not shown). The processor 21 is configured to identify the person based on the person's skin as explained with respect to FIG. 1 to FIG. 10.

It should be recognized that the embodiments describe methods with an exemplary ordering of method steps. The specific ordering of method steps is however given for illustrative purposes only and should not be construed as binding. For example the ordering of 70 and 72 in the embodiment of FIG. 9 may be exchanged. Also, the ordering of 80 and 82 in the embodiment of FIG. 10 may be exchanged. Other changes of the ordering of method steps may be apparent to the skilled person.

The described methods can also be implemented as a computer program causing a computer and/or a processor, such as processor 21, to perform the method, when being carried out on the computer and/or processor. In some embodiments, also a non-transitory computer-readable recording medium is provided that stores therein a computer program product, which, when executed by a processor, such as the processor described above, causes the methods described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Image processing system, including:
a processor configured to
receive a spectral image of a person's skin; and
identify the person based on the received spectral image of the person's skin and skin reflectance information.

(2) Image processing system of (1), wherein the processor is further configured to
generate a skin map defining for each preset area of an image split into preset areas whether the preset area is related to skin or not, wherein identifying the person is based on the skin map.

(3) Image processing system of (1) or (2), wherein the processor is further configured to
receive a RGB image; and
generate a skin map based on the RGB image, the skin map identifying for each preset area of the RGB image split into preset areas whether the preset area is related to skin or not, wherein identifying the person is further based on the skin map.

(4) Image processing system of any one of (1) to (3), wherein the processor is further configured to
generate a first skin map based on the spectral image, the first skin map identifying for each preset area of the spectral image split into preset areas whether the preset area is related to skin or not, wherein identifying the person is based on the skin map.

(5) Image processing system of (4), wherein the processor is further configured to
receive an RGB image;
generate a second skin map based on the RGB image, the second skin map identifying for each preset area of the RGB image split into preset areas whether the preset area is related to skin or not; and
generate a real skin map by combining the first skin map generated based on the spectral image and the second skin map generated based on the RGB image, wherein identifying the person is further based on the real skin map.

(6) Image processing system of (4) or (5), wherein the processor is configured to
generate the first skin map based on the spectral image based on a machine learning model, in particular an AdaBoost algorithm, a C5 algorithm, a neural network or the like.

(7) Image processing system of (6), wherein the machine learning model is trained in advance on the basis of a set of training samples, wherein each training sample includes a spectral image obtained from a spectral camera and a corresponding classifier which indicates if the spectral image is associated to skin or not.

(8) Image processing system of any one of (5) to (7), wherein the processor is further configured to
post-filter the real skin map.

(9) Image processing system of any one of (5) to (8), wherein the processor is further configured to
receive a further spectral image; and
filter the further spectral image based on the real skin map, wherein identifying the person is further based on the filtered spectral image.

(10) Image processing system of any one of (1) to (9), wherein the skin reflectance information includes skin reflection information of each of registered users stored in a database.

(11) Image processing system of (10), wherein the processor is configured to
compare the received spectral image of the person's skin with the skin reflectance information of each registered user; and
identify the person as one of the registered users, if the received spectral image matches with the skin reflectance information of one of the registered users.

(12) Image processing system of (11), wherein the processor is further configured to
determine that the person is not a registered user, if the received spectral image of the person's skin does not match with the skin reflectance information of one of the registered users.

(13) Image processing system of (11) or (12), wherein the processor is further configured to
register the person as registered user, if the received spectral image of the person's skin does not match with the skin reflectance information one of the registered users.

(14) Image processing system of any one of (1) to (13), wherein the spectral image includes spectral reflectance information which is based on radiation of a predetermined wavelength or wavelength range within the visible spectrum.

(15) Image processing system of any one of (1) to (14), wherein the processor is further configured to
pre-process the spectral image.

(16) Image processing system of any one of (1) to (15), wherein the processor is further configured to
determine a most probable user from the registered users if the person is identified as more than one user; and
identify the person as the most probable user.

(17) Image processing system of any one of (1) to (16), further including the spectral camera configured to provide the spectral image of the person's skin.

(18) Image processing system of any one of (1) to (17), further including a RGB camera configured to provide an RGB image.

(19) Image processing system of any one of (1) to (18), further including a storage device.

(20) Image processing method, including:
receiving a spectral image of a person's skin; and
identifying the person based on the received spectral image of the person's skin and skin reflectance information.

(21) Image processing method of (20), further including:
generating a skin map defining for each preset area of an image split into preset areas whether the preset area is related to skin or not, wherein identifying the person is based on the skin map.

(22) Image processing method of (20) or (21), further including:
receiving a RGB image; and
generating a skin map based on the RGB image, the skin map identifying for each preset area of the RGB image split into preset areas whether the preset area is related to skin or not, wherein identifying the person is further based on the skin map.

(23) Image processing method of any one of (20) to (22), further including:
generating a first skin map based on the spectral image obtained from the spectral camera, the first skin map identifying for each preset area of the spectral image split into preset areas whether the preset area is related to skin or not, wherein identifying the person is based on the first skin map.

(24) Image processing method of (23), further including:
receiving an RGB image;
generating a second skin map based on the RGB image, the second skin map identifying for each preset area of the RGB image split into preset areas whether the preset area is related to skin or not; and
generating a real skin map by combining the first skin map generated based on the spectral image and the second skin map generated based on the RGB image, wherein identifying the person is further based on the real skin map.

(25) Image processing method of (23) or (24), wherein generating the skin map based on the spectral image is based on a machine learning model, in particular an AdaBoost algorithm, a C5 algorithm, a neural network or the like.

(26) Image processing method of (25), wherein the machine learning model is trained in advance on the basis of a set of training samples, wherein each training sample includes a spectral image obtained from a spectral camera and a corresponding classifier which indicates if the spectral image is associated to skin or not.

(27) Image processing method of any one of (24) to (26), further including:
post-filtering the real skin map.

(28) Image processing method of any one of (24) to (27), further including:
receiving a further spectral image; and
filtering the further spectral image based on the real skin map, wherein identifying the person is further based on the filtered spectral image.

(29) Image processing method of any one of (20) to (28), wherein the skin reflectance information includes skin reflection information of each of registered users stored in a database.

(30) Image processing method of (29), wherein identifying the person includes:
comparing the received spectral image of the person's skin with the skin reflectance information of each registered user; and
identifying the person as one of the registered users, if the received spectral image matches with the skin reflectance information of one of the registered users.

(31) Image processing method of (30), wherein identifying the person further includes:
determining that the person is not a registered user, if the received spectral image of the person's skin does not match with the skin reflectance information of one of the registered users.

(32) Image processing method of (30) or (31), wherein identifying the person further includes:
registering the person as registered user, if the received spectral image of the person's skin does not match with the skin reflectance information of one of the registered users.

(33) Image processing method of any one of (20) to (32), wherein the spectral image includes spectral reflectance information which is based on radiation of a predetermined wavelength or wavelength range within the visible spectrum.

(34) Image processing method of any one of (20) to (33), further including:
pre-processing the spectral image.

(35) Image processing method of any one of (20) to (34), further including:
determining a most probable user from the registered users if the person is identified as more than one user; and
identifying the person as the most probable user.

(36) A computer program including program code causing a computer to perform the image processing method according to anyone of (20) to (35), when being carried out on a computer.

(37) A non-transitory computer-readable recording medium that stores therein a computer program product, which, when executed by a processor, causes the image processing method according to anyone of (20) to (35) to be performed.

(38) Image processing system, including:
a processor configured to
receive a spectral image;
generate a first object map based on the spectral image, the first skin map identifying for each preset area of the spectral image split into preset areas whether the preset area is related to an objector not;
receive an RGB image;
generate a second object map based on the RGB image, the second object map identifying for each preset area of the RGB image split into preset areas whether the preset area is related to the object or not; and
generate a real object map by combining the first object map generated based on the spectral image and the second object map generated based on the RGB image.

(39) Image processing system of (38), wherein the processor is configured to
generate the first skin map based on the spectral image based on a machine learning model, in particular an AdaBoost algorithm, a C5 algorithm, a neural network or the like.

(40) Image processing system of (38) or (39), wherein the machine learning model is trained in advance on the basis of a set of training samples, wherein each training sample includes a spectral image obtained from a spectral camera and a corresponding classifier which indicates if the spectral image is associated to skin or not.

(41) Image processing system of any one of (38) to (40), wherein the processor is further configured to
pre-process the spectral image.

(42) Image processing system of any one of (38) to (41), wherein the processor is further configured to
post-filter the real skin map.

(43) Image processing system of any one of (38) to (42), further including a spectral camera configured to provide the spectral image of the person's skin.

(44) Image processing system of any one of (38) to (43), further including a RGB camera configured to provide an RGB image of the person's skin.

(45) Image processing system of any one of (38) to (44), further including a storage device for storing the machine learning model.

(46) Image processing method, including:
receiving a spectral image;
generating a first object map based on the spectral image, the first object map identifying for each preset area of the spectral image split into preset areas whether the preset area is related to an object or not;
receiving an RGB image;
generating a second object map based on the RGB image, the second object map identifying for each preset area of the RGB image split into preset areas whether the preset area is related to the object or not; and
generating the real object map by combining the first object map generated based on the spectral image and the second object map generated based on the RGB image.

(47) Image processing method of (46), wherein generating the skin map based on the spectral image is based on a machine learning model, in particular an AdaBoost algorithm, a C5 algorithm, a neural network or the like.

(48) Image processing method of (46) or (47), wherein the machine learning model is trained in advance on the basis of a set of training samples, wherein each training sample includes a spectral image obtained from a spectral camera and a corresponding classifier which indicates if the spectral image is associated to skin or not.

(49) Image processing method of any one of (46) to (48), further including:
pre-processing the spectral image.

(50) Image processing method of any one of (46) to (49), further including:
post-filtering the real skin map.

(51) A computer program including program code causing a computer to perform the image processing method according to anyone of (46) to (50), when being carried out on a computer.

(52) A non-transitory computer-readable recording medium that stores therein a computer program product, which, when executed by a processor, causes the image processing method according to anyone of (46) to (50) to be performed.

The invention claimed is:

1. Image processing system, comprising:
a processor configured to
receive a spectral image of a person's skin,
generate a first skin map based on the spectral image, the first skin map identifying for each preset area of the spectral image split into preset areas whether the preset area is related to skin or not,
receive an RGB image,
generate a second skin map based on the RGB image, the second skin map identifying for each preset area of the RGB image split into preset areas whether the preset area is related to skin or not,
generate a real skin map by combining the first skin map and the second skin map, and
identify the person based on the first skin map, skin reflectance information, and the real skin map.

2. Image processing system of claim 1, wherein generating the real skin map includes for each preset area of the image, analyzing the preset area with respect to a skin characteristic dependent on an image type.

3. Image processing system of claim 1, wherein the processor is further configured to
generate the first skin map based on the spectral image based on a machine learning model.

4. Image processing system of claim 3, wherein the machine learning model is trained in advance on the basis of a set of training samples, wherein each training sample comprises a spectral image obtained from a spectral camera and a corresponding classifier which indicates if the spectral image is associated to skin or not.

5. Image processing system of claim 1, wherein the processor is further configured to
post-filter the real skin map.

6. Image processing system of claim 1, wherein the processor is further configured to
receive a further spectral image; and
filter the further spectral image based on the real skin map, wherein identifying the person is further based on the filtered spectral image.

7. Image processing system of claim 1, wherein the skin reflectance information comprises skin reflectance information of each of registered users stored in a database.

8. Image processing system of claim 1, wherein the processor is further configured to
compare the received spectral image of the person's skin with skin reflectance information of each registered user; and
identify the person as one of the registered users, if the received spectral image matches with the skin reflectance information of one of the registered users.

9. Image processing system of claim 8, wherein the processor is further configured to
determine that the person is not a registered user, if the received spectral image of the person's skin does not match with the skin reflectance information of one of the registered users.

10. Image processing system claim 8, wherein the processor is further configured to
register the person as registered user, if the received spectral image of the person's skin does not match with the skin reflectance information of one of the registered users.

11. Image processing system of claim 1, wherein the spectral image comprises spectral reflectance information which is based on radiation of a predetermined wavelength or wavelength range within the visible spectrum.

12. Image processing system of claim 1, the processor is further configured to pre-process the spectral image.

13. Image processing system of claim 1, wherein the processor is further configured to
determine a most probable user from the registered users if the person is identified as more than one user; and
identify the person as the most probable user.

14. Image processing system of claim 1, further comprising a spectral camera configured to provide the spectral image of the person's skin.

15. Image processing system of claim 1, further comprising a RGB camera configured to provide an RGB image.

16. Image processing method, comprising:

receiving a spectral image of a person's skin;

generating a first skin map based on the spectral image, the first skin map identifying for each preset area of the spectral image split into preset areas whether the preset area is related to skin or not;

receiving an RGB image;

generating a second skin map based on the RGB image, the second skin map identifying for each preset area of the RGB image split into preset areas whether the preset area is related to skin or not;

generating a real skin map by combining the first skin map and the second skin map; and identifying the person based on the first skin map, skin reflectance information, and the real skin map.

17. A non-transitory computer-readable storage medium storing computer-readable instructions thereon which, when executed by a computer, cause the computer to perform a method, the method comprising:

receive a spectral image of a person's skin;

generating a first skin map based on the spectral image, the first skin map identifying for each preset area of the spectral image split into preset areas whether the preset area is related to skin or not;

receiving an RGB image;

generating a second skin map based on the RGB image, the second skin map identifying for each preset area of the RGB image split into preset areas whether the preset area is related to skin or not;

generating a real skin map by combining the first skin map and the second skin map; and identifying the person based on the first skin map, skin reflectance information, and the real skin map.

* * * * *